(12) United States Patent
Black

(10) Patent No.: US 6,250,149 B1
(45) Date of Patent: Jun. 26, 2001

(54) SYSTEM AND METHOD FOR GENERATING AIRCRAFT FLIGHT DATA USING A FLUSH-MOUNTED AIR DATA SYSTEM

(75) Inventor: Richard A. Black, Seattle, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/288,601

(22) Filed: Apr. 8, 1999

(51) Int. Cl.⁷ ........................................ G01C 21/00
(52) U.S. Cl. ............................................. 73/178 R
(58) Field of Search ........................ 73/178 R, 181, 73/170.01, 170.02, 170.07, 170.08, 170.11; 364/557, 516, 424.02, 424.03, 424.06, 551.01; 244/194, 195, 198, 201, 203

(56) References Cited

U.S. PATENT DOCUMENTS

| 5,001,638 | 3/1991 | Zimmerman et al. . |
| 5,457,630 | 10/1995 | Palmer . |
| 5,691,921 | 11/1997 | Berlin . |
| 5,755,408 | 5/1998 | Schmidt et al. . |

*Primary Examiner*—William Oen
(74) *Attorney, Agent, or Firm*—Brooks & Kushman P.C.

(57) ABSTRACT

A system and method for generating air flight data for an aircraft includes a network of substantially flush-mounted sensor modules which generate flow rate information and/or static pressure information for the many of the aircraft's aerodynamic surfaces, preferably near the respective leading edges of the aerodynamic surfaces. The generated flow rate information and static pressure information are collected by a remotely-located controller. A processor calculates desired air flight data, including airspeed, aircraft altitude and airframe attitude information, based on the collected flow rate information and the static pressure information. Preferably, the processor selectively weights flow rate and static pressure information when calculating the desired air flight data such that flow rate information predominates at relatively low airspeeds and pressure information predominates at relatively higher airspeeds.

29 Claims, 3 Drawing Sheets

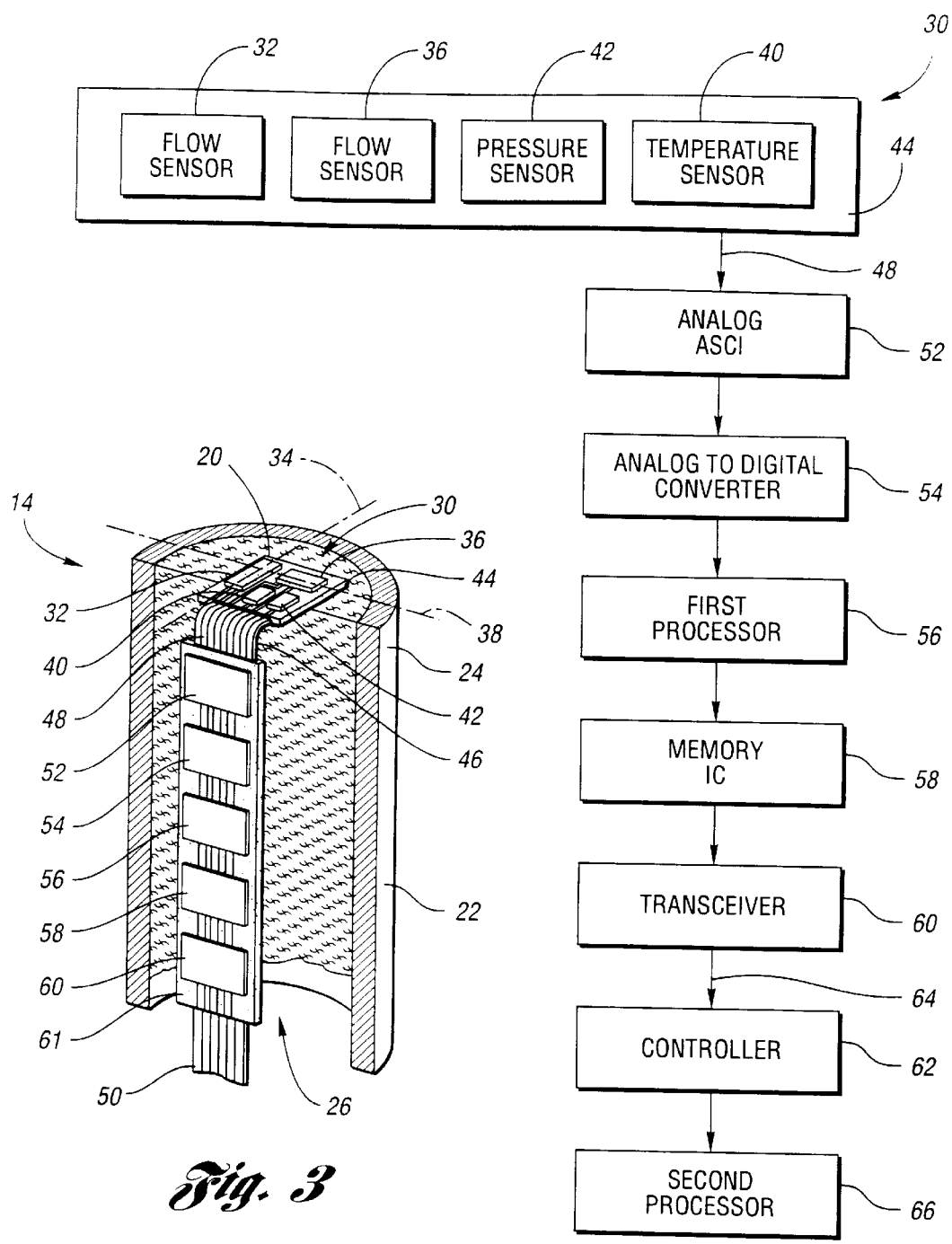

SYSTEM AND METHOD FOR GENERATING AIRCRAFT FLIGHT DATA USING A FLUSH-MOUNTED AIR DATA SYSTEM

FIELD OF THE INVENTION

This invention relates to a system and method for generating information which characterizes the movement of an object through a fluid, such as an aircraft during flight, using one or more flow sensors which are substantially flush-mounted within at least one surface of the object.

BACKGROUND INFORMATION

Aircraft typically include multiple systems for measuring physical parameters across various parts of the aircraft during flight, from which air flight data, including airspeed, altitude and airframe attitude (pitch and yaw) information, is typically derived. Such multiple systems may include an airframe data system which monitors physical parameters about the body, wings, tail, nacelle of an aircraft to provide an indication of airspeed, attitude, temperature, and static pressure about the aircraft; and an electronic engine control system provides data to regulate the air/fuel ratio distributed to each of the aircraft's engines. The prior art teaches supplementing the information gathered by one system with that of another. For example, in one known approach, the static pressure information provided by an airframe data system is supplemented by the temperature information provided by an engine control system.

Such prior art systems employ a wide variety of sensors, structures and techniques for gathering the desired physical parameter information, including nose-mounted booms, Pitot tubes and flush-mounted static pressure taps, and optical data systems. Each of these prior art systems has its deficiencies or disadvantages.

For example, nose booms, which are generally effective at providing airspeed and altitude information, typically include sensors for measuring static pressure, total pressure and temperature. However, nose booms reduce the aerodynamics of the aircraft, making them impractical to use during normal aircraft flight.

Pitot tubes are also generally effective at providing airspeed and altitude information by measuring static pressure, dynamic pressure and temperature about an aircraft. However, Pitot tubes can not be flush-mounted to the airframe of an aircraft and lose accuracy at speeds below about 20 m/s (about 66 ft/s). Flush-mounted static pressure taps sensor systems are typically mounted to the nose of an aircraft, as well as opposite sides of various aerodynamic surfaces, to measure static pressure, total pressure and differential pressures. Flush-mounted static pressure taps typically require the use of a remotely-located temperature sensor, and the placement of such taps in the nose of an aircraft may effect aircraft radar systems. And, as with Pitot tubes, systems employing flush-mounted static pressure taps similarly lose accuracy at speeds below about 30.5 m/s (about 100 ft/s).

Optical data systems are generally effective at generating airspeed and airframe attitude information by projecting a beam of light ahead of the aircraft. The beam is reflected by atmospheric particles back to an optical sensor. The optical system then infers airspeed and airframe attitude based on the beam measurements. Optical systems are not able to measure either pressure or temperature at the sensing location, requiring the use of additional sensors. Additionally, the electronics packaging for each optical sensor is larger and heavier than traditional sensor electronic packages, requiring additional structural modifications be made to support each optical sensor.

SUMMARY OF INVENTION

A system for generating information which characterizes movement of an object through a fluid, such as an aircraft moving through air during flight, includes at least one sensor module and, preferably, a plurality of sensor modules that are respectively mounted substantially flush with a plurality of respective aerodynamic surfaces of the aircraft. Each module includes a set of sensors mounted on or in the first surface of each module. The sensors generate signals representative of a plurality of physical parameters associated with fluid flow over the module's first surface and, hence, nominally over the aerodynamic surface at the module's location on the aircraft.

Each module minimally includes at least one flow sensor and, preferably, two flow sensors which generate a first and second signal representative of a flow rate of the fluid over the module's first surface along two orthogonal sensing axes, respectively, and a temperature sensor which generates a third signal representative of the temperature of the first surface. While the invention contemplates any suitable manner for mounting the sensors on or in the module's first surface, the sensors are preferably mounted on a first, common substrate which underlies the module's first surface to thereby place the module's flow sensors substantially flush with the aircraft surface.

In a preferred embodiment, each module includes electronic signal-conditioning and/or signal-processing components in electrical communication with each sensor. By way of example only, the electronic components may be conveniently mounted on a second, common substrate which is interconnected with the first sensor-supporting substrate using a flexible tape carrier having an electrically-conductive data bus defined therein. A first signal processor thus preferably receives the first, second and third signals and generates a fourth signal which minimally includes temperature-corrected flow rate information based on the first, second and third signals. In a constructed embodiment, wherein each sensor generates analog signals, each module further includes a digital-to-analog converter which converts the first, second and third analog sensor output signals to digital form; and the first signal processor digitally processes the first, second and third digitally-converted signals to generate the fourth signal, which is also a digital signal.

In a preferred embodiment, each module is in electrical communication with a remotely-located controller, for example, via a data bus on the aircraft external to the modules. The remotely-located controller periodically calls for and collects the fourth signal from each module. More specifically, when the controller calls for the fourth signal from a given module, the module's first signal processor transmits both the processor node address and the fourth signal along the tape carrier's data bus and the external data bus to the controller.

A second signal processor receives the collected fourth signals from the controller and calculates the desired movement-characterizing information, e.g., air flight data including relative airspeed and airframe attitude information, based on the collected fourth signals.

In accordance with another feature of the invention, in a constructed embodiment where the desired air flight data includes aircraft altitude information, at least one module includes a pressure sensor which generates a fifth analog signal representative of a static pressure acting on the module's first surface. Indeed, under the invention, where enhanced system operation is desired at airspeeds above those likely to cause saturation of each module's flow sensor, i.e., above perhaps about 153 m/s (about 500 ft/s), at least four modules and, most preferably, every module includes a pressure sensor which generates a fifth analog signal representative of a static pressure acting on each module's respective first surface. Preferably, the aircraft surface at the discrete locations at which the modules including pressure sensors are deployed is preferably nominally canted at an angle of about 12° to thereby provide a nominal pressure gradient on the module's first surface at level flight, whereby the repeatability of pressure sensor measurements is significantly improved.

In modules which include pressure sensors, the fifth signal is suitably conditioned and received by the first signal processor in a manner similar to that described above in connection with the first, second and third signals. The first signal processor then generates static pressure information based on the fifth and second signals and incorporates such static pressure information in the fourth signal. The second processor thereafter calculates additional characterizing information, e.g., aircraft altitude information and, perhaps, other air flight data, based on the static pressure information in the collected fourth signals.

For example, as a further benefit of the invention in the context of generating air flight data, if a sufficient number of pressure-sensing modules are deployed about the surface of an aircraft, such static pressure information may itself form a second basis upon which the second signal processor calculates airspeed, e.g., when the aircraft is operated over perhaps about 30.5 m/s (perhaps about 100 ft/s). If an even greater number of pressure-sensing modules are employed, such static pressure information may further form a basis upon which the second signal processor alternatively calculates airframe attitude information when airspeed rises above perhaps about 30.5 m/s (perhaps about 100 ft/s).

Still further, in accordance with another feature of the invention, when calculating the desired air flight data, the second digital signal processor preferably selectively weights the flow rate information and static pressure information contained in the collected fourth signals such that flow rate information predominates when the airspeed falls below about 30.5 m/s (about 100 ft/s). Similarly, when calculating the desired air flight data, the second digital signal processor preferably selectively weights the flow rate information and static pressure information contained in the collected fourth signals such that static pressure information predominates when airspeed rises above the airspeed at which each flow sensor's analog signal saturates, i.e., perhaps about 153 m/s (about 500 ft/s).

BRIEF DESCRIPTION OF DRAWINGS

FIG. 3 is a sectional view in perspective of a sensor module illustrating its sensors and additional electronic components mounted on a flexible tape carrier within a tubular module housing;

FIG. 4 is a block diagram illustrating one embodiment of the sensor electronics package of each sensor module of the present invention;

DETAILED DESCRIPTION OF THE INVENTION

Figure 1:
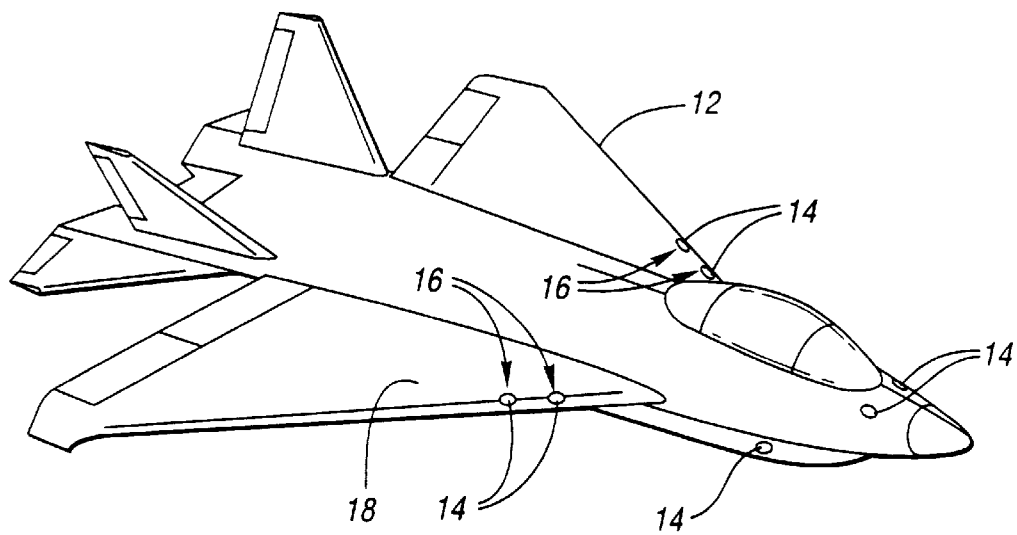
FIG. 1 is a perspective view of an aircraft including an air data system of the present invention having a plurality of flush-mounted sensor modules mounted about leading surfaces of the aircraft.
Figure 2:
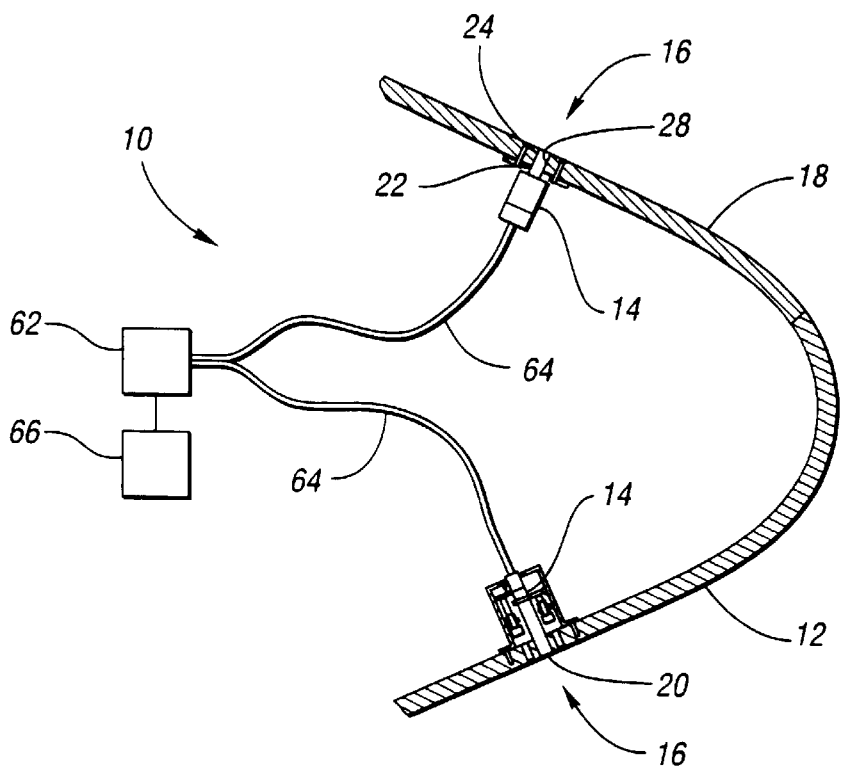
FIG. 2 is a cross-sectional view of the leading edge of a wing of the aircraft illustrated in FIG. 1.

An exemplary system 10 for generating air flight data, including airspeed, aircraft altitude and airframe attitude information, for an aircraft 12 during flight is illustrated in FIGS. 1 and 2. The system 10 includes a plurality of sensor modules 14 deployed at discrete locations 16 about the surface 18 of the aircraft 12. More specifically, each module 14 is mounted to suitable airframe structures beneath the aircraft surface 18 at its respective location 16 such that a first surface 20 of each module 14 is mounted substantially flush with the aircraft surface 18. By way of example only, in a constructed embodiment, the module 14 locks into place within the airframe so as to provide a surface tolerance of perhaps about 0.0025 cm (0.001 inches) between the module's first surface 20 and the aircraft surface 18. In this manner, separated or circular flow across the aircraft surface 18 due to module placement is substantially avoided.

Because accurate airframe attitude data is difficult to generate when the modules 14 are mounted within relatively flexible airframe surfaces, each module 14 is preferably mounted in the aircraft 12 nearest a leading-edge of a relatively non-flexible surface 18, such as the root of a wing or in the body portion of the fuselage, rather than in the aircraft's wing tips or tail. Of course, while leading-edge placement provides the system 10 with improved accuracy, sensor survivability from physical flight hazards, such as insect strikes and debris, may preferably be increased by displacing the modules 14 slightly away from such leading edges, as illustrated in FIGS. 1 and 2.

While the invention contemplates the use of module housings of any nominal geometry, in the illustrated embodiment, each module 14 includes a generally tubular housing 22 whose first longitudinal end 24 defines the extent of the module's first surface 20. The interior of the housing 26, seen more clearly in FIG. 3, is preferably sealed against environmental effects, as through use of a suitable potting material (not shown). In the exemplary system 10, each module housing 22 projects through a complimentary aperture 28 formed in the aircraft surface 18 at the module's respective location 16 the aircraft surface 18 to define the module's exposed first surface 20. The use of a generally tubular housing 22 facilitates ready removal and replacement of the module 14, as discussed further below in connection with FIGS. 5 and 6.

Returning to FIG. 3, each module 14 includes a set of sensors 30 disposed on or in the module's first surface 20. The sensors 30 generate signals representative of various physical parameters associated with fluid flow across the surface 18 of the aircraft 12 at each module's respective location 16 during flight. In the exemplary system 10, each module 14 includes a first flow sensor 32 which generates a first analog signal representative of the mass flow rate or local flow rate (hereinafter "flow rate") of air over the module's first surface 20 along a first sensing axis 34, and a second flow sensor 36 which generates a second analog signal representative of flow rate of air over the module's first surface 20 along a second sensing axis 38 which is generally orthogonal to the first sensing axis 34. Each flow sensor 32,36 is preferably a hot-wire anemometer-style microelectromechanical flow sensor. Suitable flow sensors 32,36 for generating aircraft air flight data are available from United Micromachines of Temple City, Calif.

The presence of a pair of flow sensors 32,36 having orthogonal sensing axes 34,38 on each module 14 enables the module 14 to sense both the direction and rate of the airstream flowing over the module's respective location 16 during aircraft flight. Thus, while deployment of a greater number of modules 14 may be desired for any suitable reason, such as redundancy, the exemplary system 10 is able to generate certain air flight data, including airspeed and airframe attitude, using only two modules 14 when one module 14 is located at a substantially horizontal location 16 on the aircraft surface 18 and another module 14 is located at a substantially vertical location 16 on the aircraft surface 18.

In the exemplary system 10, each module 14 also includes a temperature sensor 40 which generates a third analog signal representative of the temperature of the module's first surface 20 during flight. Depending upon the design of the temperature sensor 40, it will be appreciated that the temperature sensor 40 may be located either on or in the module's first surface 20. As discussed further below, the third analog signal generated by the temperature sensor 40 is used, at least in part, to correct the first and second signals respectively generated by the first and second flow sensors 32,36 for temperature.

In accordance with another feature of the invention, at least one module 14 and, indeed, in the exemplary system 10, each module 14 further includes a static pressure sensor 42 mounted on or in the module's first surface 20. The static pressure sensor 42 generates a fourth analog signal representative of a static pressure acting on the first surface 20 of the module 14 during flight. As discussed further below, the fourth analog signal is likewise corrected for temperature effects on the pressure sensor 42 using the third analog signal generated by the temperature sensor 40.

As discussed more fully below, the presence of a pressure sensor 42 on at least one module 14 provides static pressure information sufficient to enable the exemplary system 10 to calculate aircraft altitude information. The presence of a pressure sensor 42 on at least two modules 14 enables the exemplary system 10 to calculate both aircraft altitude information and airspeed from the static pressure information. Finally, the presence of a pressure sensor 42 on at least four modules and, most preferably, on nine or more modules 14 enables the exemplary system 10 to calculate aircraft altitude, airspeed and airframe attitude information.

In accordance with another feature of the exemplary system 10, the aircraft surface 18 is preferably canted at an angle of about 12° at the discrete locations 16 at which the modules 14 having pressure sensors 42 are deployed. Such a nominal canted angle provides a nominal pressure gradient on the module's first surface 20 and, hence, on the pressure sensor 42 at level flight to significantly improve the reliability and repeatability of module pressure measurements.

While the invention contemplates any suitable arrangement whereby the set of sensors 30 is mounted in or on the module's first surface 20, in an exemplary constructed embodiment, each module 14 includes a first substrate 44 disposed within the module housing 22 just beneath the module's first surface 20, as illustrated in FIG. 3. Each sensor 32,36,40,42 is a microelectromechanical sensor mounted on the first substrate 44.

A set of signal conditioning and/or processing components is also preferably included in each module 14 to receive and condition/process the analog signals respectively generated by the module's sensors 32,36,40,42. Thus, in the exemplary system 10, each module 14 includes an analog signal-conditioning integrated circuit (IC), such as an analog signal-conditioning processor 52; an analog-to-digital converter 54; a first digital signal processor 56; a memory IC 58; and a transceiver 60.

By way of example only, in the exemplary system 10, the signal-conditioning and signal-processing components 52,54,56,58,60 are each conveniently mounted upon a second, common substrate 61 which is electrically interconnected with the first substrate 44 and, particularly, with the sensors 32,36,40,42 via a first flexible tape carrier 46 whose electrically-conductive traces form an electrically-conductive bi-directional data bus 48. A second flexible tape carrier 50 interconnects the module's electronic components 52,54,56,58,60 with a suitable electrical connector (not shown) at the housing's other end.

As illustrated diagrammatically in FIG. 4, during aircraft flight, the sensors 32,36,40,42 of each module 14 respectively generate the first, second, third and fourth analog signals in response to the air stream acting on each module's upper surface 20. These analog signals are fed over the module's data bus 48 to the analog signal-conditioning processor 52, which suitably conditions and amplifies each signal. The amplified signals are fed over the module's data bus 48 to the analog-to-digital converter 54, which converts each signal into digital form.

The digital signal processor 56 collects the digitally-converted signals and generates a fifth, digital signal based on the digitally-converted signals which includes both temperature-corrected flow rate information and temperature-corrected static pressure information. The fifth signal is then stored by the first digital signal processor 56 in the module's memory IC 58.

As illustrated schematically in FIG. 2, each module 14 is in electrical communication with a remote controller 62 disposed within the aircraft 12, for example, via a data bus 64 on the aircraft 12. As noted above, in a constructed embodiment, the external data bus 64 may be conveniently connected to the module's signal-conditioning and signal-processing components 52,54,56,58,60 using an electrical connector which is adapted to mate with the connector provided at the housing's other end. In this manner, the module 14 is quickly, reliably and removably connected to the external data bus 64.

The controller 62 communicates with each sensor module 14 through the external data bus 64. In response to a call signal from controller 62, the first digital signal processor 56 of each module 14 retrieves the fifth signal from the memory IC 58 and transmits the processor node address and the fifth signal using the transceiver 60 along the external data bus 64 to the controller 62. The controller 62 collects the fifth signal transmitted by each module 14. A second digital signal processor 66 in communication with the controller 62 retrieves the collected fifth signals and calculates the desired air flight data based on the collected fifth signals. The air flight data then can be transmitted on to the aircraft flight controls, or alternatively, to another remote location.

Because each module 14 includes a static pressure sensor 42, in accordance with another feature of the invention, when calculating the desired air flight data, the second digital signal processor 66 preferably selectively weights the flow rate information and static pressure information contained in the collected fourth signals such that flow rate information predominates when the airspeed falls below about 30.5 m/s (about 100 ft/s). Similarly, when calculating the desired air flight data, the second digital signal processor preferably selectively weights the flow rate information and static pressure information contained in the collected fourth signals such that static pressure information predominates when airspeed rises above the airspeed at which each flow sensor's analog signal saturates, i.e., perhaps about 153 m/s (about 500 ft/s).

As noted above, the invention contemplates any suitable arrangement by which each module 14 is mounted substantially flush with the surface 18 of the aircraft 12 at its respective location 16. The pair of exemplary module installations illustrated in FIG. 2 are shown in greater detail in FIGS. 5 and 6.

Figure 5:
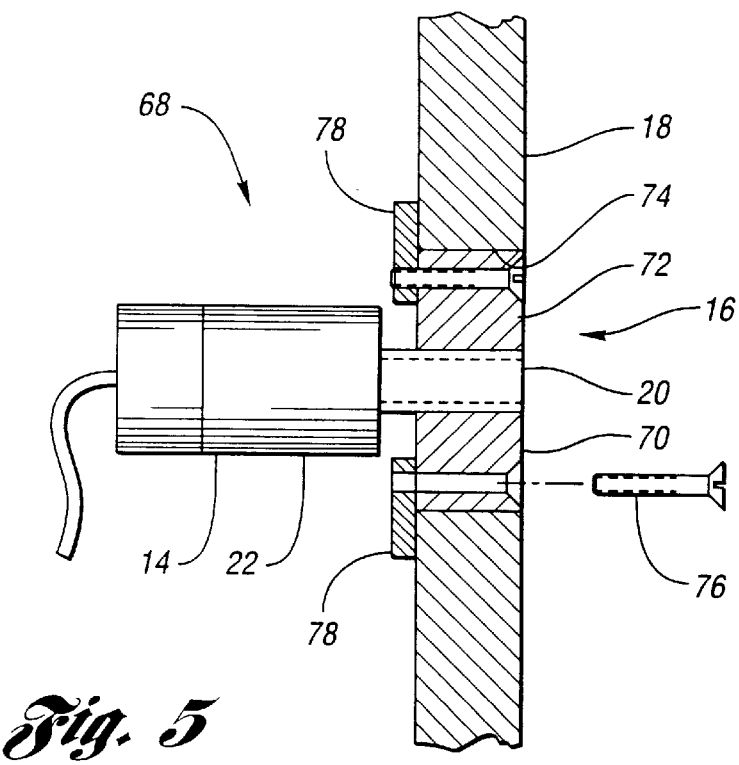
FIG. 5 is an enlarged cross-sectional view of one of the sensor modules of FIG. 2 illustrating a first exemplary mounting structure.

Referring to FIG. 5, in a first exemplary installation 68, the first longitudinal end 24 of the module's housing 22 is secured to a removable panel 70 such that the module's first surface 20 is flush with the external surface 72 of the panel 70. The panel 70 is itself secured within a complimentary aperture 74 defined within the aircraft's surface 18 at the module's respective location 16 thereon. While the invention contemplates securing the removable panel 70 to the airframe in any suitable manner, in the first exemplary installation 68, the removable panel 70 is conveniently secured as by fasteners 76 to backing members 78 underlying the surface 18 of the aircraft 12. In this manner, the first exemplary installation provides ease of replacement of any given module 14 simply by releasing the fasteners 76 and removing the panel 70 (with its attached module housing 22).

Figure 6:
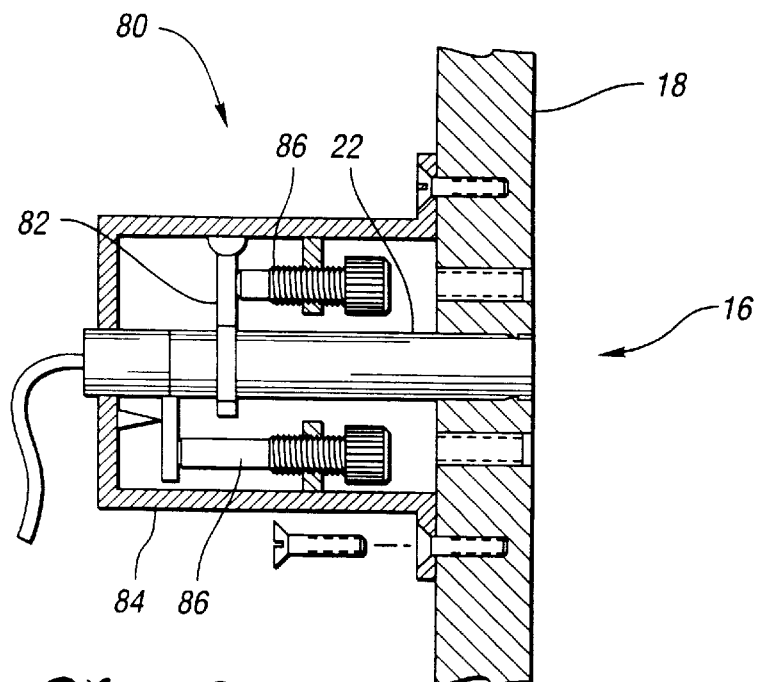
FIG. 6 is an enlarged cross-sectional view of another of the sensor modules of FIG. 2 illustrating a second exemplary modular mounting structure.

FIG. 6 shows a second exemplary installation 80, in which the module housing 22 is supported by a movable carriage 82 which, in turn, is supported by a frame 84 integrated within the structure underlying the surface 18 of the aircraft 12 at the module's respective location 16. The relative position of the carriage 82 on the frame 84 is adjusted via set screws 86 which are accessible through access holes 88 in the aircraft's surface 18. In this manner, the module's first surface 20 is precisely positioned relative to the surface 18 of the aircraft 12 while otherwise facilitating removal/replacement of the module 14 from the aircraft 12 upon suitable adjustment of the set screws 86.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Thus, for example, while a system and method of generating desired air flight data for an aircraft has been illustrated and described, it will be appreciated that the invention contemplates characterizing the movement of different objects, such as motor vehicles, through air, as well as characterizing the movement of still other objects through other fluids, such as torpedoes, submersible vessels and other crafts through water.

What is claimed is:

1. A system for generating information which characterizes the movement of an object through a fluid, wherein the object has at least one fluid-engaging exterior surface, the system comprising:
    at least one sensor module having a first surface mounted substantially flush with a respective one of the exterior surfaces of the object, each module including:
        a first flow sensor generating a first signal representative of a flow rate of the fluid over the first surface along a first sensing axis, and
        a temperature sensor generating a second signal representative of a temperature of the first surface;
    a first processor in communication with the first flow sensor and the temperature sensor of each module, wherein the first processor generates a third signal for each module based on the first and second signals; and
    a second processor in communication with first processor, wherein the second processor calculates the characterizing information based on the third signals.

2. The system of claim 1, including a controller in communication with the first and second processors, respectively, wherein the controller periodically collects the third signal generated by the first processor for each module and supplies the collected third signals to the second processor.

3. The system of claim 1, wherein the system includes at least two modules; wherein the first processor is included in each module; and wherein the controller and the second processor are each positioned remotely with respect to one of the modules.

4. The system of claim 1, wherein each module further includes a second flow sensor generating a fourth signal representative of a flow rate of the fluid over the first surface along a second sensing axis, the second sensing axis being generally orthogonal to the first sensing axis; and wherein the first processor generates the third signal based on the first, second and fourth signals.

5. The system of claim 1, wherein each module has a pressure sensor generating a fifth signal representative of a static pressure acting on the first surface; and wherein the first processor generates the third signal based on the first, second and fifth signals.

6. The system of claim 5, wherein the third signal generated by the first processor of each module includes flow rate information and static pressure information.

7. The system of claim 6, wherein the second processor selectively weights the flow rate information and static pressure information contained in the collected third signals such that the characterizing information is predominantly based on flow rate information when the relative speed of the object through the fluid falls below a first threshold level.

8. The system of claim 6, wherein the second processor selectively weights the flow rate information and received static pressure information contained in the received fourth signals such that the characterizing information is predominantly based on static pressure information when the relative speed of the object through the fluid rises above a second threshold level.

9. A system for generating air flight data for an aircraft having a plurality of aerodynamic surfaces, the system comprising:
    a plurality of sensor modules, each module having a first surface mounted substantially flush with a respective one of the plurality of aerodynamic surfaces, each module including:
        a first flow sensor generating a first signal representative of flow rate over the first surface along a first sensing axis,
        a temperature sensor generating a second signal representative of a temperature of the first surface, and
        a first processor in communication with the first flow sensor and the temperature, wherein the first processor generates a third signal based on the first and second signals; and
    a second processor in communication with the controller, wherein the second processor calculates the air flight data based on the collected third signals.

10. The system of claim 9, including a controller in communication with the first and second processors, respectively, wherein the controller periodically collects the third signal generated by the first processor for each module and supplies the collected third signals to the second processor.

11. The system of claim 9, wherein the first and second signals are analog signals, and wherein each module further includes an analog signal conditioner mounted to the data bus, the analog signal conditioner receiving the first and second signals.

12. The system of claim 9, further including at least one module having a second flow sensor generating a fourth signal representative of flow rate over the first surface along a second sensing axis, the second sensing axis being generally orthogonal to the first sensing axis; and wherein the first processor generates the third signal based on the first, second and fourth signals.

13. The system of claim 9, further including at least one module having a pressure sensor generating a fifth signal representative of a static pressure acting on the first surface; and wherein the first processor of the at least one module generates the third signal based on the first, second and fifth signals.

14. The system of claim 13, wherein the third signal generated by the first processor of each module includes flow rate information and static pressure information.

15. The system of claim 14, wherein the second processor selectively weights the flow rate information and static pressure information contained in the collected third signals such that generated air flight data is predominantly based on flow rate information when airspeed falls below about 30.5 m/s.

16. The system of claim 14, wherein the second processor selectively weights the flow rate information and received static pressure information contained in the received fourth signals such that generated air flight data is predominantly based on static pressure information when airspeed rises above about 153 m/s.

17. The system of claim 9, wherein each module is removably secured within a respective one of the aerodynamic surfaces.

18. A module for generating air flight data for an aircraft during flight, the module comprising:
    a housing having a first surface, wherein the housing is adapted to be mounted substantially flush with an aerodynamic surface of the aircraft;
    a first one flow sensor generating a first analog signal representative of a flow rate over the first surface along a first sensing axis;
    a temperature sensor generating a second analog signal representative of a temperature of the first surface;
    an analog-to-digital converter in electrical communication with the first flow sensor and the temperature sensor, wherein the analog-to-digital converter digitally-converts the first and second analog signals to obtain a first and second digital signal; and
    a first digital signal processor receiving the first and second digital signals, the first processor generating a third digital signal including temperature-corrected flow rate information based on the first and second digital signal.

19. The module of claim 18, including a second flow sensor generating a fourth analog signal representative of a flow rate over the first surface along a second sensing axis that is generally orthogonal to the first sensing axis, and wherein the analog-to-digital converter is in electrical communication with the second flow sensor, the analog-to-digital converter digitally-converts the fourth analog signal to obtain a fourth digital signal, the first processor receives the fourth digital signal, and the first processor generates the third signal based on the first, second and fourth digital signals.

20. The module of claim 18, including a static pressure sensor generating a fifth analog signal representative of a static pressure acting on the first surface, and wherein the analog-to-digital converter is in electrical communication with the pressure sensor, the analog-to-digital converter digitally-converts the fifth analog signal to obtain a fifth digital signal, the first processor receives the fifth digital signal, and the first processor generates the third signal based on the first, second and fifth digital signals.

21. The module of claim 20, including wherein the third signal generated by the first signal processor is a digital signal including flow rate information and static pressure information.

22. The module of claim 18, including a flexible tape carrier having an electrically-conductive data bus, and wherein the flow sensor and the temperature sensor are electrically interconnected with the first signal processor over the flexible tape carrier.

23. The module of claim 18, wherein the first, second and third signals are analog signals, and wherein each module further includes an analog signal conditioner receiving at least two of the first, second and third signals.

24. The module of claim 18, wherein the housing is adapted to be received within a complementary aperture formed in an aerodynamic surface of the aircraft.

25. The module of claim 24, wherein the housing is generally of cylindrical shape with a first longitudinal end and a second longitudinal end, and wherein the first surface is defined by the first longitudinal end of the housing.

26. A method for generating air flight data for an aircraft comprising:
    generating, at each of a plurality of aerodynamic surfaces, a first analog signal representative of a flow rate over the surface;
    generating, at each surface, a second analog signal representative of a temperature of the surface;
    generating, proximate to each surface, a third digital signal based on the first and second signals, wherein the third signal includes temperature-corrected flow rate information; and
    collecting, at a location remote from at least one surface, the third signal generated at each surface to obtain a data set; and
    calculating the air flight data based on the data set.

27. The method of claim 26, further including generating, at each of a plurality of aerodynamic surfaces, a second analog signal representative of a static pressure acting on the surface; and wherein the first digital signal further includes temperature-corrected static pressure information.

28. The method of claim 27, wherein calculating includes selectively weighting the flow rate information and static pressure information in the data set such that flow rate information predominates when airspeed falls below about 30.5 m/s.

29. The method of claim 27, wherein calculating includes selectively weighting the flow rate information and static pressure information in the data set such that static pressure information predominates when airspeed rises above about 153 m/s.

* * * * *